(12) United States Patent
Nakano et al.

(10) Patent No.: US 9,937,972 B2
(45) Date of Patent: Apr. 10, 2018

(54) WINDSHIELD DEVICE FOR SADDLE-RIDE TYPE VEHICLE

(71) Applicant: HONDA MOTOR CO., LTD., Minato-ku, Tokyo (JP)

(72) Inventors: Nobuhiko Nakano, Wako (JP); Shota Suzuki, Wako (JP); Sakae Endo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/453,197

(22) Filed: Mar. 8, 2017

(65) Prior Publication Data

US 2017/0267304 A1 Sep. 21, 2017

(30) Foreign Application Priority Data

Mar. 18, 2016 (JP) ................................ 2016-055474

(51) Int. Cl.
*B62J 17/04* (2006.01)
(52) U.S. Cl.
CPC ..................... *B62J 17/04* (2013.01)
(58) Field of Classification Search
CPC ....................................................... B62J 17/04
USPC ....................................................... 296/78.1
See application file for complete search history.

(56) References Cited

U.S. PATENT DOCUMENTS

| | | | |
|---|---|---|---|
| 4,355,838 A | 10/1982 | Hickman | |
| 4,830,423 A * | 5/1989 | Nebu | B62J 17/02 296/78.1 |
| 5,730,483 A | 3/1998 | Greger | |
| 7,458,626 B1 | 12/2008 | Stadnyk | |
| 9,199,683 B2 * | 12/2015 | Kitagawa | B62J 17/04 |
| 9,714,064 B2 * | 7/2017 | Suzuki | B62J 17/04 |
| 2002/0041107 A1 | 4/2002 | Takemura et al. | |
| 2003/0062740 A1 | 4/2003 | Takemura et al. | |
| 2006/0028045 A1 | 2/2006 | Furuhashi et al. | |
| 2006/0144178 A1 | 7/2006 | Wegener et al. | |
| 2009/0195011 A1 * | 8/2009 | Tsuda | B62J 17/04 296/78.1 |

(Continued)

FOREIGN PATENT DOCUMENTS

| | | |
|---|---|---|
| JP | S62-101589 A | 5/1987 |
| JP | H07-329859 A | 12/1995 |

(Continued)

OTHER PUBLICATIONS

Japanese Office Action dated Jul. 25, 2017 in the corresponding Japanese patent application 2016-055474, with the English translation thereof.

(Continued)

*Primary Examiner* — Gregory A Blankenship
(74) *Attorney, Agent, or Firm* — Carrier Blackman & Associates, P.C.; Joseph P. Carrier; William D. Blackman

(57) ABSTRACT

In a windshield device for a saddle-ride type vehicle equipped with a windshield portion provided adjustably in height, the windshield portion is attached through a rail member 41, the rail member 41 is equipped with an upper elongate hole 48*b*, a lever member 42 covering the upper elongate hole 48*b* and a lock pin 46 fixed to a body side are equipped, the rail member 41 is provided slidably relative to the lock pin 46 inserted through the upper elongate hole 48*b*, and the lever member 42 is equipped with a plurality of holes 68 with which the lock pin 46 is engageable.

10 Claims, 12 Drawing Sheets

(56) References Cited

U.S. PATENT DOCUMENTS

| 2013/0099521 A1 | 4/2013 | Kato |
| 2014/0035319 A1 | 2/2014 | Kitagawa |
| 2015/0266532 A1 | 9/2015 | Horiuchi et al. |
| 2016/0251049 A1* | 9/2016 | Tsuda ..................... B62J 17/04 296/78.1 |
| 2017/0021887 A1 | 1/2017 | Wada et al. |
| 2017/0267304 A1* | 9/2017 | Nakano ................... B62J 17/04 |

FOREIGN PATENT DOCUMENTS

| JP | 2002-096783 A | 4/2002 |
| JP | 2003-081160 A | 3/2003 |
| JP | 2010-070107 A | 4/2010 |
| JP | 2010-070168 A | 4/2010 |
| JP | 2010-149686 A | 7/2010 |
| JP | 2011-020616 A | 2/2011 |
| JP | 2013-091387 A | 5/2013 |
| JP | 2014-028591 A | 2/2014 |
| JP | 2015-040032 A | 3/2015 |
| JP | 2015-178341 A | 10/2015 |
| JP | 2015-205548 A | 11/2015 |

OTHER PUBLICATIONS

Extended European search report dated Aug. 2, 2017 in the corresponding EP patent application 17159106.8.

* cited by examiner

WINDSHIELD DEVICE FOR SADDLE-RIDE TYPE VEHICLE

INCORPORATION BY REFERENCE

The present application claims priority under 35 U.S.C. § 119 to Japanese Patent Application No. 2016-055474 filed on Mar. 18, 2016. The content of the application is incorporated herein by reference in its entirety.

TECHNICAL FIELD

The present invention relates to a windshield device for a saddle-ride type vehicle.

BACKGROUND ART

Heretofore, in windshield devices for saddle-ride type vehicles, there has been known one wherein a windscreen (windshield portion) is made to be movable about a shaft arranged to be directed in a vehicle width direction and wherein the windscreen is made to be adjustable in height (refer to Patent Literature 1, for example). In Patent Literature 1, the windscreen is supported by guide connecting bars (links) of four in total including those of upper, lower, right and left, and these guide connecting bars are pivotally moved by a motor through the aforementioned shaft to move the windscreen.

CITATION LIST

Patent Literature

[Patent Literature 1] JP-A No. H7-329859

SUMMARY OF INVENTION

Technical Problem

However, in the aforementioned prior art windshield device, the provision of the motor and the shaft being long in the vehicle width direction causes the windshield device to be increased in dimension. Further, the shaft and the like are likely to affect the aerodynamic performance.

The present invention has been made in view of the abovementioned circumstances, and an object of the present invention is to make the windshield device of a movable type and at the same time, to downsize the windshield device.

Solution to Problem

To attain the abovementioned object, an aspect of the present invention is directed to a windshield device for a saddle-ride type vehicle including a windshield portion (31) provided adjustably in height, wherein the windshield portion (31) is attached through a rail member (41), the rail member (41) being equipped with an elongate hole (48b). The windshield device includes a lever member (42) covering the elongate hole (48b) and a lock pin (46) fixed to a body side. The rail member (41) is provided slidably relative to the lock pin (46) inserted through the elongate hole (48b). The lever member (42) includes a plurality of holes (68) with which the lock pin (46) is engageable.

According to the aspect of the present invention, in the windshield device for the saddle-ride type vehicle, the windshield portion is attached through the rail member, the rail member is equipped with an elongate hole, the lever member covering the elongate hole and the lock pin fixed to the body side are equipped, the rail member is provided slidably relative to the lock pin inserted through the elongate hole, and the lever member is equipped with the plurality of holes with which the lock pin is engageable. Thus, the rail member with the windshield portion attached thereto is slidden through the elongate hole relative to the lock pin on the body side, and a desired hole of the plurality of the holes of the lever member is engaged with the lock pin, so that the height of the windshield portion can be adjusted to a desired position. Accordingly, it is possible to adjust the height of the windshield portion in a simplified configuration and to make the windshield device of a movable type and downsized.

Further, in an aspect of the present invention, the lever member (42) includes a lock plate (65) provided inside the lever member (42), and the plurality of holes (68) are formed at the lock plate (65).

According to the aspect of the present invention, the plurality of holes are formed at the lock plate provided inside the lever member. Thus, the plurality of holes with which the lock pin is engaged can be protected by the lever member, and the quality of appearance of the windshield device can be improved by hiding the holes behind the lever member.

Further, in an aspect of the present invention, the lever member (42) is provided pivotably about a hinge (43), the lever member (42) is urged by an elastic member (44) in a direction to engage the holes (68) with the lock pin (46), and the lever member (42) includes a pressured portion (64) pressured against the urging force of the elastic member (44).

According to the aspect of the present invention, the lever member is provided pivotably about the hinge, and the lever member is urged by the elastic member in the direction to engage the holes with the lock pin and is equipped with the pressured portion pressured against the urging force of the elastic member. Thus, by the urging force of the elastic member, it is possible to keep the state that the hole is engaged with the lock pin. Further, the height of the windshield portion can be changed by releasing the engagement of the hole with the lock pin in a simple operation of pressuring the pressured portion, and thus, the operability is excellent.

Furthermore, in an aspect of the present invention, the rail member (41) includes a second elongate hole (52a) being slidable relative to the body side in a direction different from the elongate hole (48b).

According to the aspect of the present invention, the rail member is equipped with the second elongate hole being slidable relative to the body side in the direction different from the elongate hole, and thus, when the rail member is slidden through the elongate hole and the second elongate hole, the angle of the windshield portion is changed. Thus, it is possible to adjust not only the height of the windshield portion but also the angle of the windshield portion.

Further, in an aspect of the present invention, the second elongate hole (52a) is provided at a front and lower side of the elongate hole (48b), and the second elongate hole (52a) is slanted at a larger inclination than the elongate hole (48b) in a side view.

According to the aspect of the present invention, since the second elongate hole is provided at the front and lower side of the elongate hole and is slanted at the larger inclination than the elongate hole in a side view, the angle of the windshield portion can be adjusted.

Further, in an aspect of the present invention, the lock pin (46) includes a taper portion (46b) and a flat portion (46c), the taper portion (46b) being tapered off in the engaging direction with the holes (68), the flat portion (46c) being formed at a surface supporting the load of the windshield portion (31).

According to the aspect of the present invention, the lock pin is equipped with the taper portion tapered off in the engaging direction with the holes and the flat portion formed at the surface supporting the load of the windshield portion. Thus, it is possible to easily engage the lock pin and the hole thanks to the taper portion and to effectively support the windshield portion at the flat portion.

Further, in an aspect of the present invention, the windshield device includes a bracket (40) fixed to a body, and the lock pin (46) is provided at the bracket (40).

According to the aspect of the present invention, since the bracket fixed to the body is equipped, and since the lock pin is provided at the bracket, it is possible to provide the lock pin easily on the body side.

Further, in an aspect of the present invention, the plurality of the holes (68) of the lever member (42) are provided at three or more places, and indicators (70) enabling the alignments of the plurality of holes (68) with the lock pin (46) are provided at a location being visually confirmable from a rider side in correspondence to the positions of the plurality of holes (68).

According to the aspect of the present invention, the indicators enabling the alignments of the plurality of holes with the lock pin are provided at the location being visually confirmable from the rider side in correspondence to the positions of the plurality of holes. Thus, since it is possible for the rider to engage a desired hole with the lock pin by reference to the marks of the indicators, the adjustment of the windshield portion in height is easy.

Furthermore, in an aspect of the present invention, a slider (49) inserted into the elongate hole (48b) and being slidable relative to the elongate hole (48b) is attached to the lock pin (46).

According to the aspect of the present invention, since the slider inserted into the elongate hole and being slidable relative to the elongate hole is attached to the lock pin, it is possible to slide the rail member relative to the lock pin through the slider accurately and smoothly.

Further, in an aspect of the present invention, the at least one rail member (41) includes a plurality of right and left rail members (41), the plurality of right and left rail members (41) supporting the windshield portion (31) on right and left sides, and the lock pins (46) are respectively engaged with the holes (68) at the rail members (41) on the right and left sides.

According to the aspect of the present invention, the rail members are provided as right and left one pair supporting the windshield portion on the right and left sides, and the lock pins are respectively engaged with the holes at the rail members on the right and left sides. Thus, since the rail members on the right and left sides can be fixed through the engagements of the lock pins with the holes, the windshield portion can be supported rigidly.

Advantageous Effects of Invention

In the windshield device for the saddle-ride type vehicle according to the aspect of the present invention, the height of the windshield portion can be adjusted in a simplified configuration, and the windshield device can be made to be of a movable type and at the same time, can be downsized.

Further, the lever member can protect the plurality of holes with which the lock pin is engaged, and the quality of appearance of the windshield device can be improved by hiding the holes behind the lever member.

Further, by the urging force of the elastic member, it is possible to keep the state that the hole is engaged with the lock pin. Further, the engagement of the hole with the lock pin can be released in a simple operation of pressuring the pressured portion, and thus, the operability is excellent.

Furthermore, it is possible to adjust not only the height of the windshield portion but also the angle of the windshield portion.

Further, it is possible to easily engage the lock pin and the holes thanks to the taper portion of the lock pin and to effectively support the windshield portion at the flat portion of the lock pin.

Further, it is possible to provide the lock pin easily on the body side through the bracket.

Further, it is possible to engage a desired hole with the lock pin by reference to the marks of the indicators.

Furthermore, it is possible to slide the rail member relative to the lock pin through the slider accurately and smoothly.

Further, the rail members on the right and left side can support the windshield portion rigidly.

DESCRIPTION OF EMBODIMENTS

Figure 1:
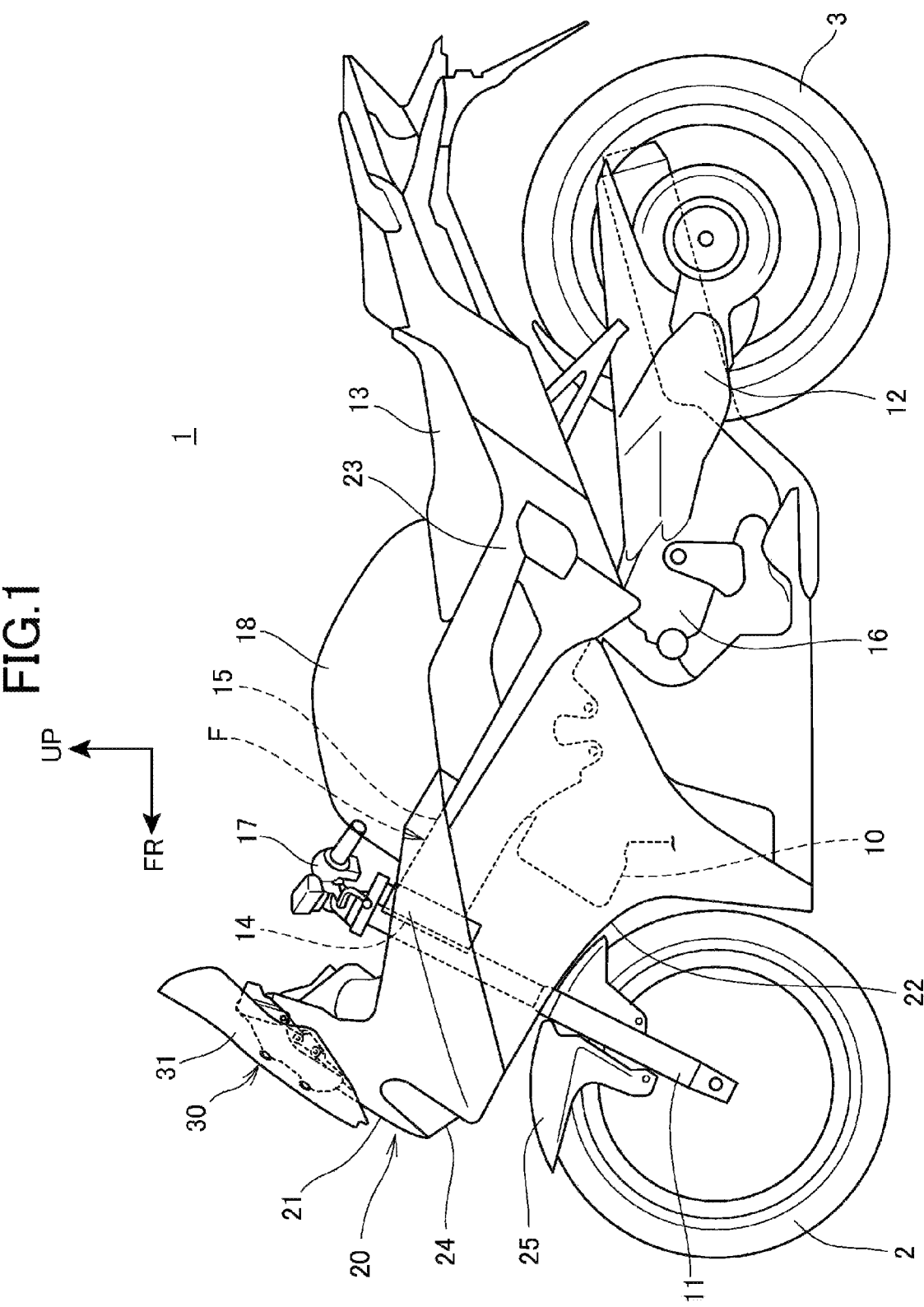
FIG. 1 is a left side view of a motorcycle according to an embodiment of the present invention.

Hereinafter, an embodiment according to the present invention will be described with reference to the drawings. Incidentally, throughout the description, the representation of directions such as front, rear, right, left and up and down are regarded as the same as those given to a body unless indicated otherwise. Further, in each drawing, symbol FR indicates the front side of the body, symbol UP indicates the upper side of the body, and symbol LH indicates the left side of the body. Further, in the drawings, the right side of the body is indicated by symbol RH on occasion.

FIG. 1 is a left side view of a motorcycle according to an embodiment of the present invention.

The motorcycle 1 is a vehicle wherein an engine 10 as a power unit is mounted on a body frame F, wherein a front fork 11 steerably supporting a front wheel 2 is steerably supported at a front end of the body frame F, and wherein a swing arm 12 supporting a rear wheel 3 is provided at a rear side of the body frame F. The motorcycle 1 is a saddle-ride type vehicle provided with an occupant seat 13 enabling an occupant to sit astride an upper portion of the rear portion of the body frame F.

The body frame F is equipped with a head pipe 14 pivotably supporting the front fork 11, a main frame 15 extending rearward from the head pipe 14, and a pivot frame 16 extending downward from a rear end of the main frame 15.

An engine 10 is provided under the main frame 15 and ahead of the pivot frame 16.

The front fork 11 is provided at an upper end portion with a handle 17 for a rider to steer.

A fuel tank 18 is provided over the main frame 15 at a position behind the head pipe 14 and ahead of the seat 13.

The motorcycle 1 is equipped with a body cover 20 covering the body frame F and the engine 10. The body cover 20 is equipped with a front cover 21 covering the head pipe 14 and an upper portion of the front fork 11 from the front side, a front side cover 22 covering the main frame 15 and the engine 10 from lateral sides, and a rear cover 23 covering the lower side of the occupant seat 13.

A headlight 24 is provided on a front face of the front cover 21. A front fender 25 covering the front wheel 2 from above is attached under the front cover 21 and at a lower portion of the front fork 11.

A windshield device 30 equipped with a plate-like windscreen 31 (windshield portion) extending in a vertical direction is attached to the front cover 21.

Figure 2:
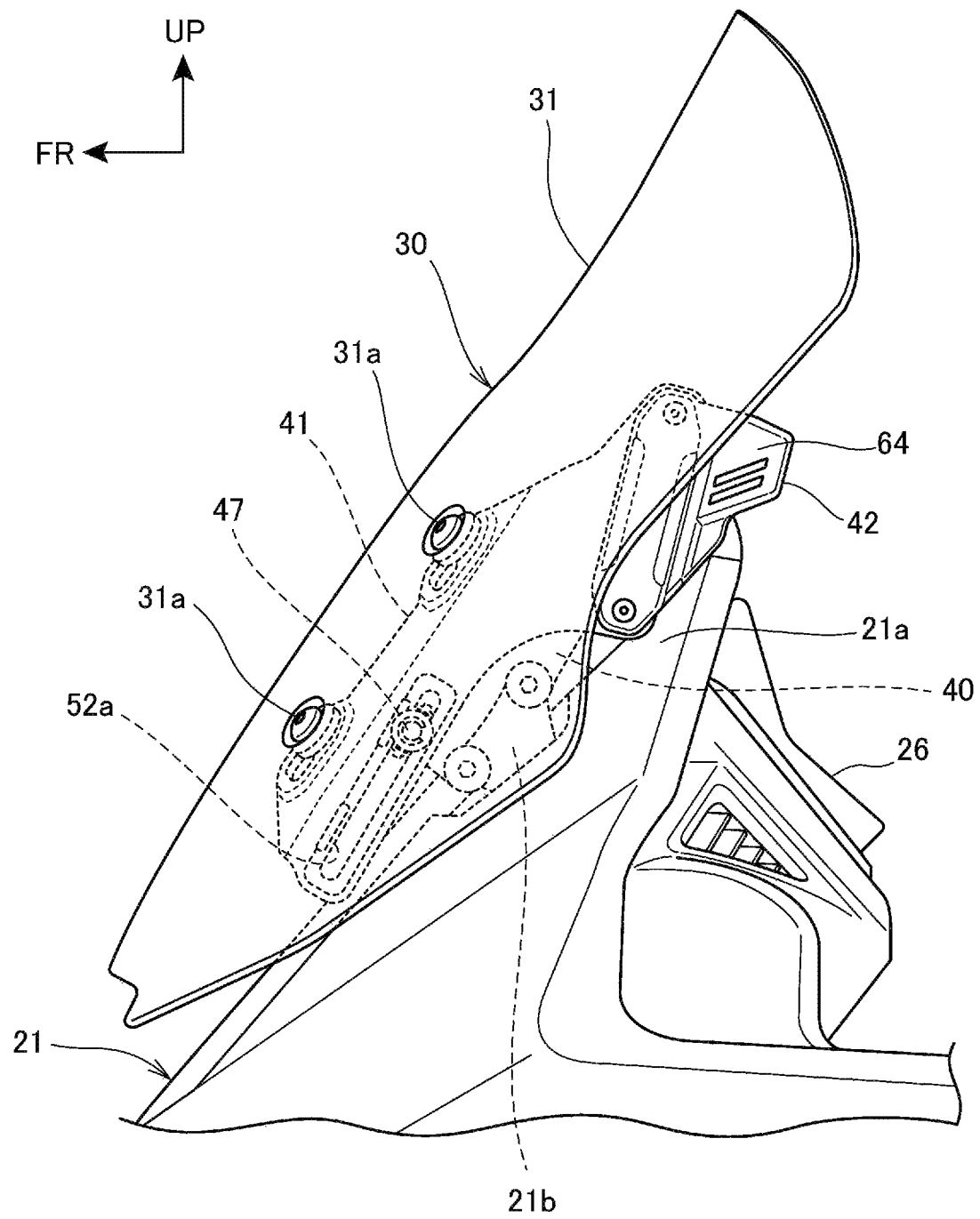
FIG. 2 is a left side view of a front portion of the motorcycle.
Figure 3:
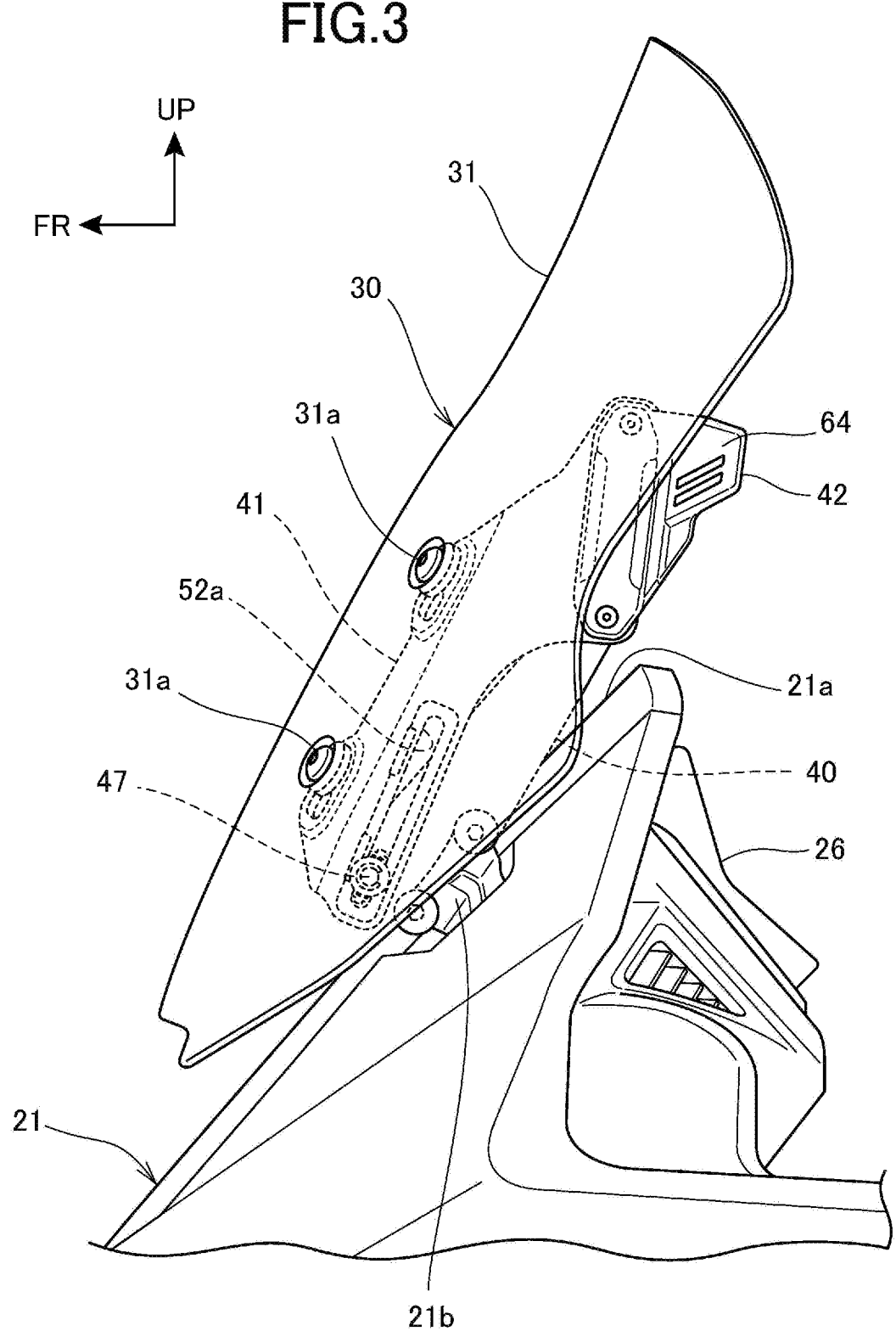
FIG. 3 is the left side view of the front portion of the motorcycle.

FIG. 2 and FIG. 3 are left side views of a front portion of the motorcycle 1.

The windshield device 30 is configured so that the height and the angle of the windscreen 31 are adjustable. FIG. 2 shows a "low position" state that the windscreen 31 is set to the lowest position. FIG. 3 shows a "high position" state that the windscreen 31 is set to the highest position. In the windshield device 30, the windscreen 31 is slidden in the vertical direction, so that the height of the windscreen 31 is adjustable stepwise between the "low position" and the "high position".

The front cover 21 is equipped with a meter visor portion 21a covering from the front side a meter device 26 provided ahead of the handle 17 (FIG. 1). The meter visor portion 21a is located over the head light 24 and is slanted rearwardly upward in a side view.

The windshield device 30 is attached to a front face of the meter visor portion 21a.

The front cover 21 is equipped with right and left pair of the plate-like stay members 21b, 21b (FIG. 3) extending upward from the front face of the meter visor portion 21a.

Figure 4:
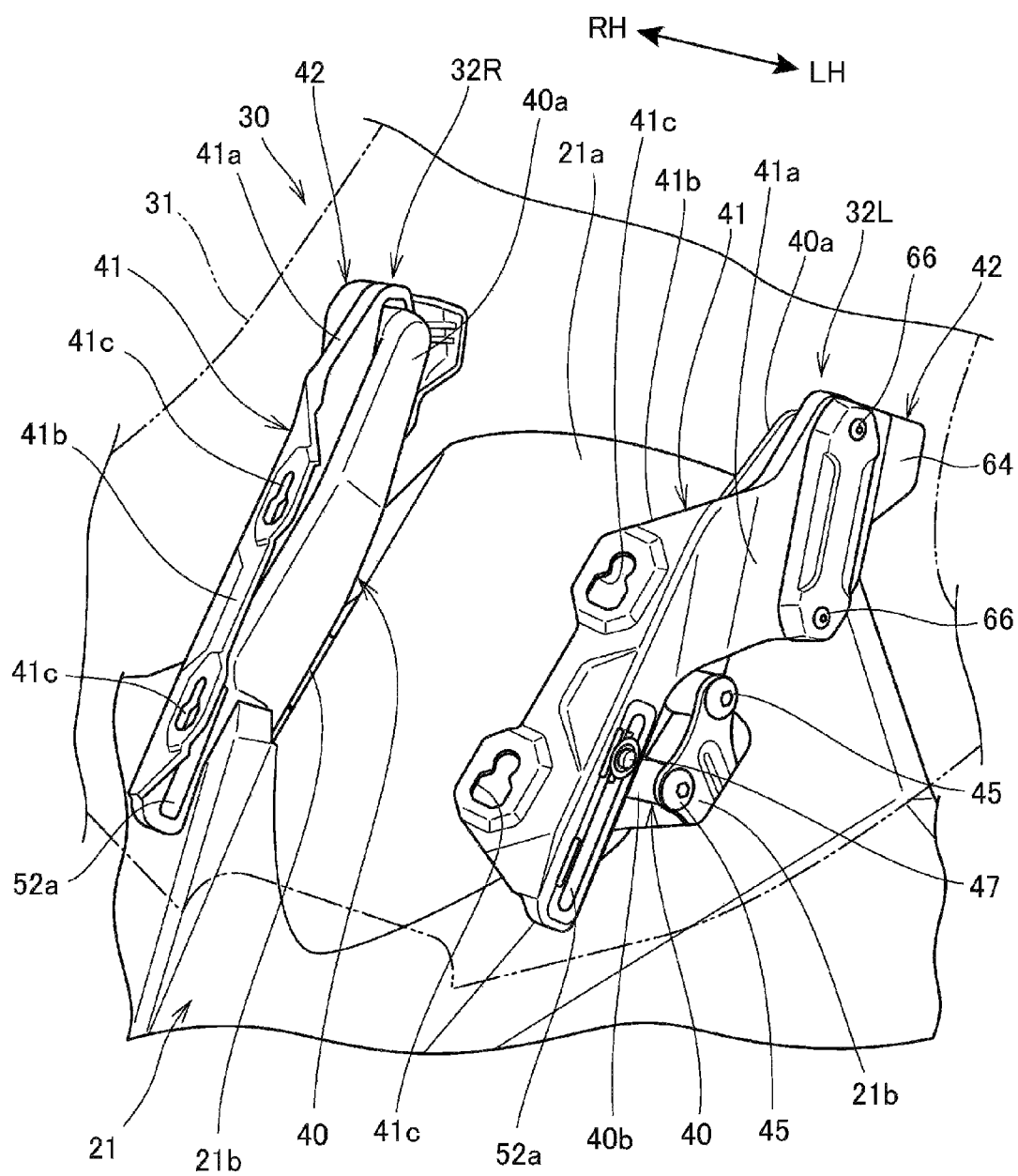
FIG. 4 is a perspective view of a windshield device as viewed from the front side.

FIG. 4 is a perspective view of the windshield device 30 as viewed from the front side. Here, FIG. 4 shows the windscreen 31 by the imaginary line.

The windshield device 30 is equipped with right and left pair of screen support members 32L, 32R supporting the windscreen 31. The screen support members 32L, 32R are disposed to be distributed right and left on the basis of a center in a vehicle width direction and are each fixed to the meter visor portion 21a.

The screen support members 32L, 32R are configured to be right and left symmetrical. Thus, hereinafter, the screen support member 32L on the left side will mainly be described, while the description of the screen support member 32R on the right side will be omitted at discretion.

Figure 5:
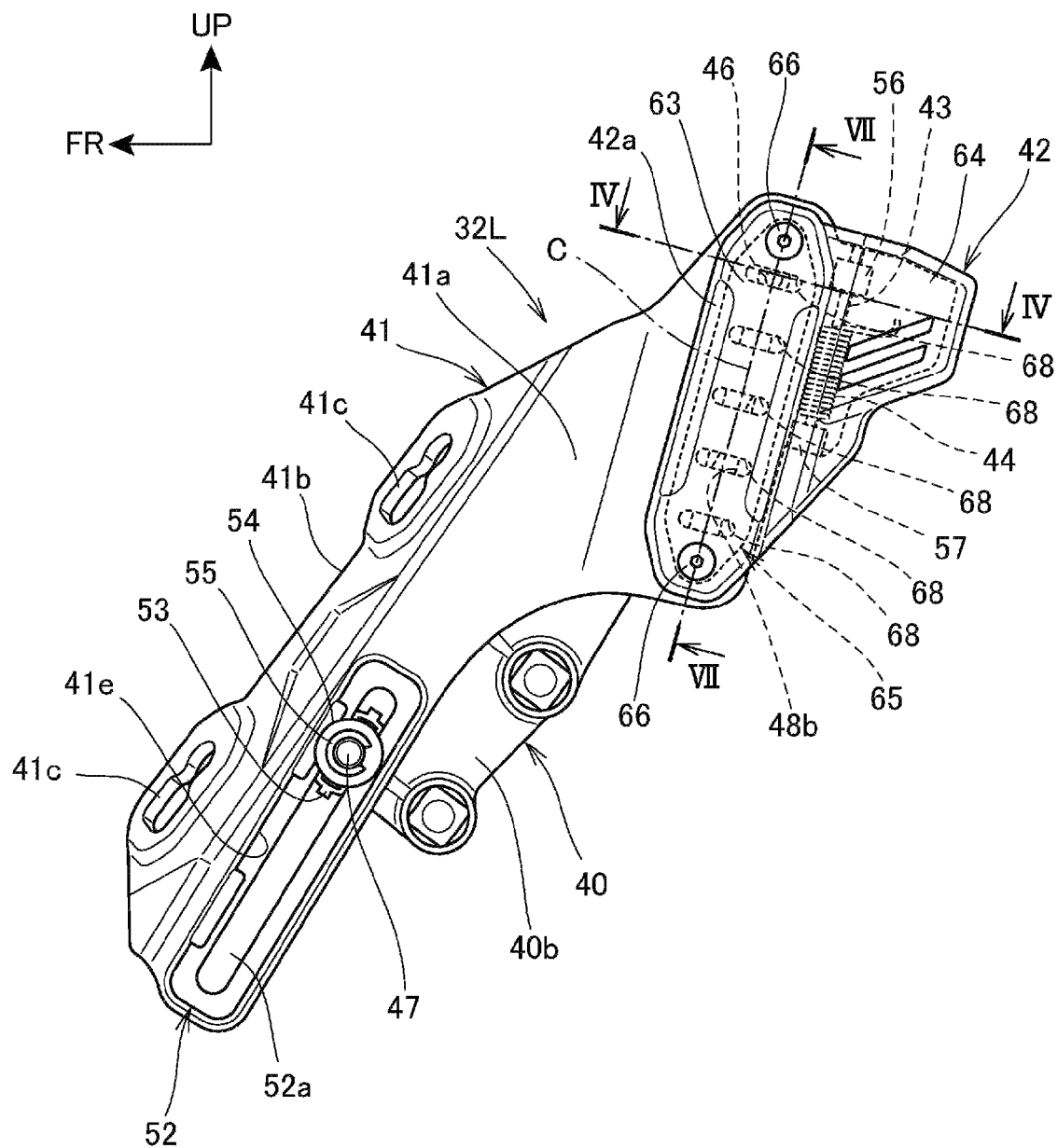
FIG. 5 is a left side view of a screen support member on the left side.
Figure 6:
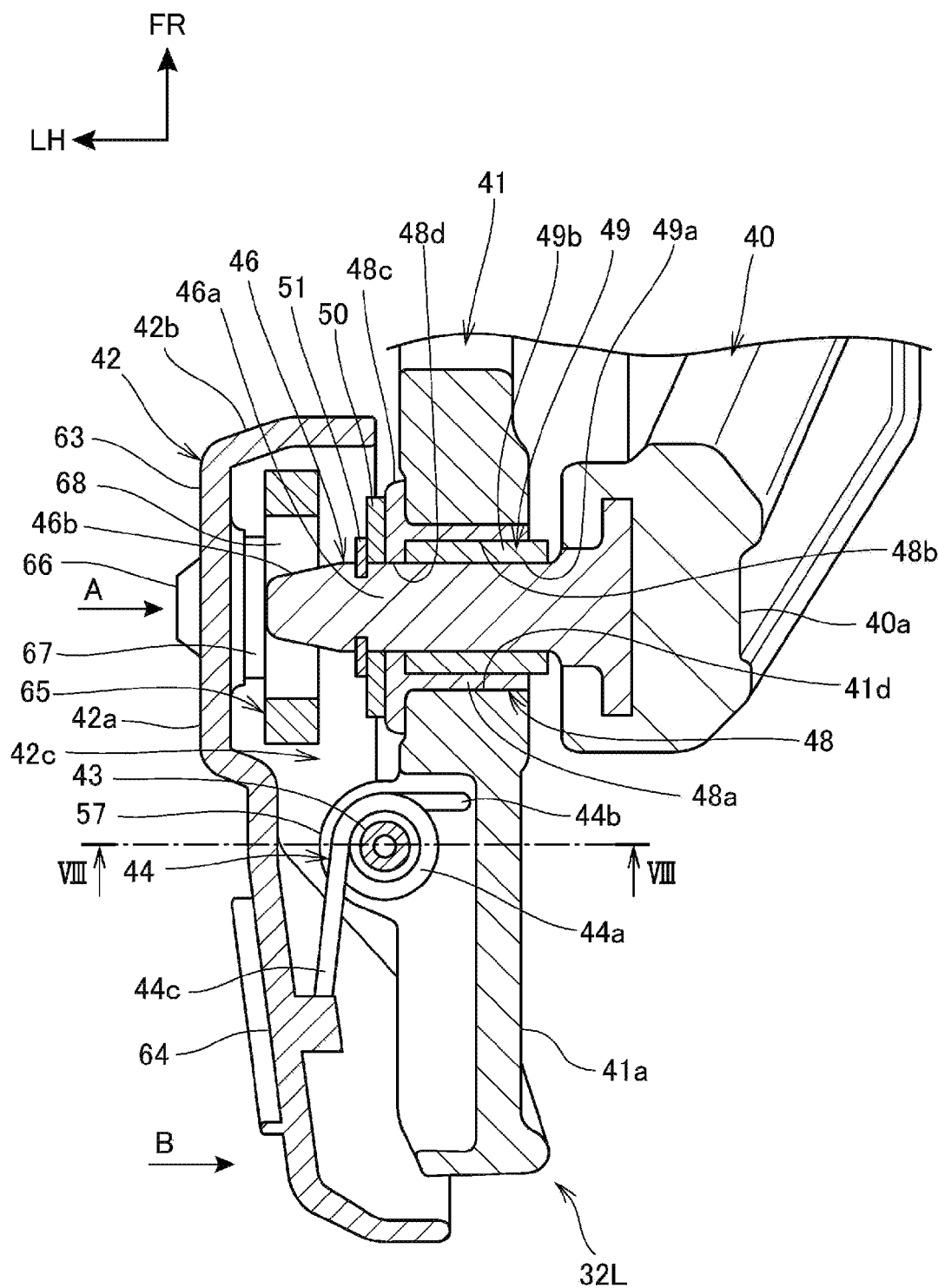
FIG. 6 is a VI-VI sectional view in FIG. 5.
Figure 7:
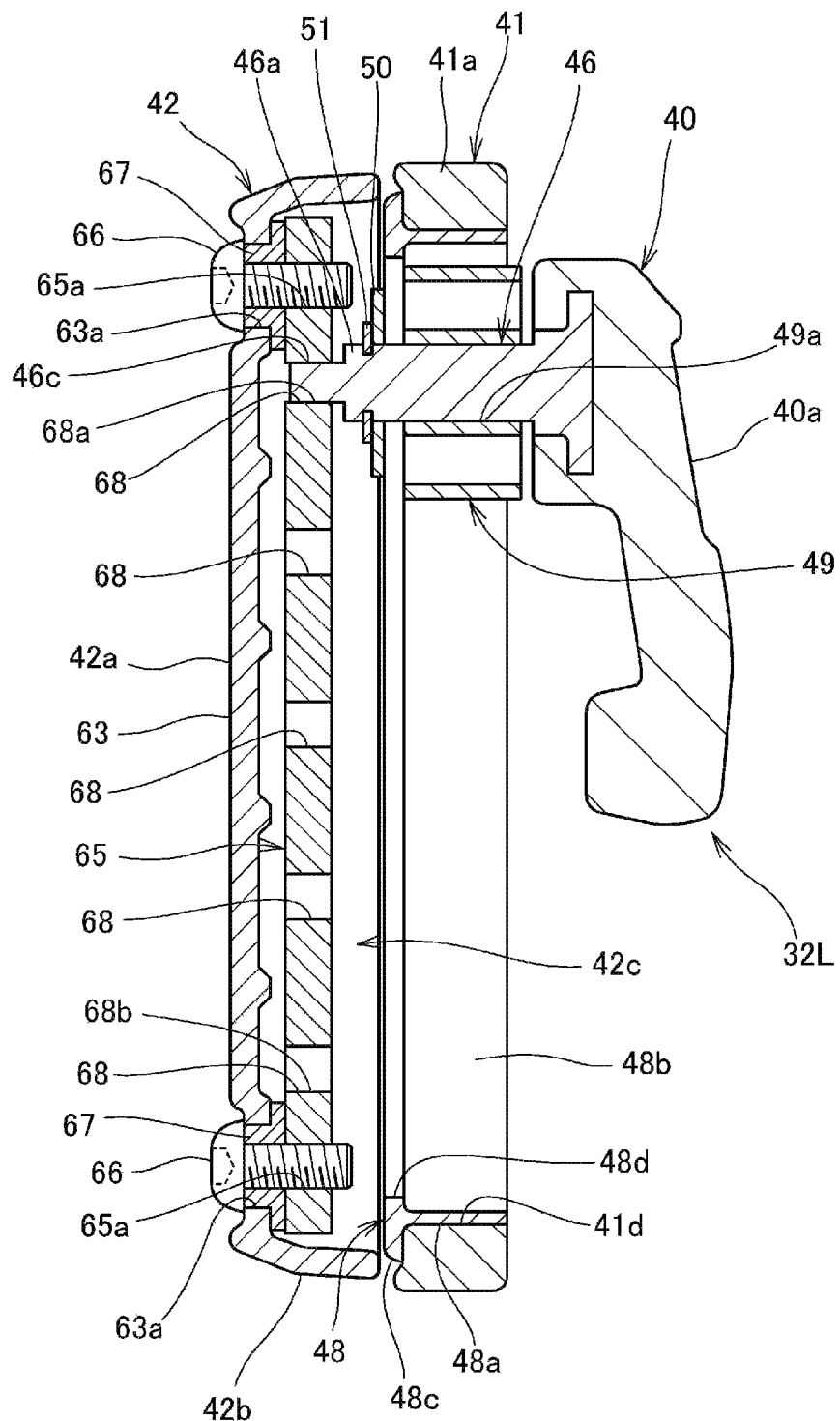
FIG. 7 is a VII-VII sectional view in FIG. 5.
Figure 8:
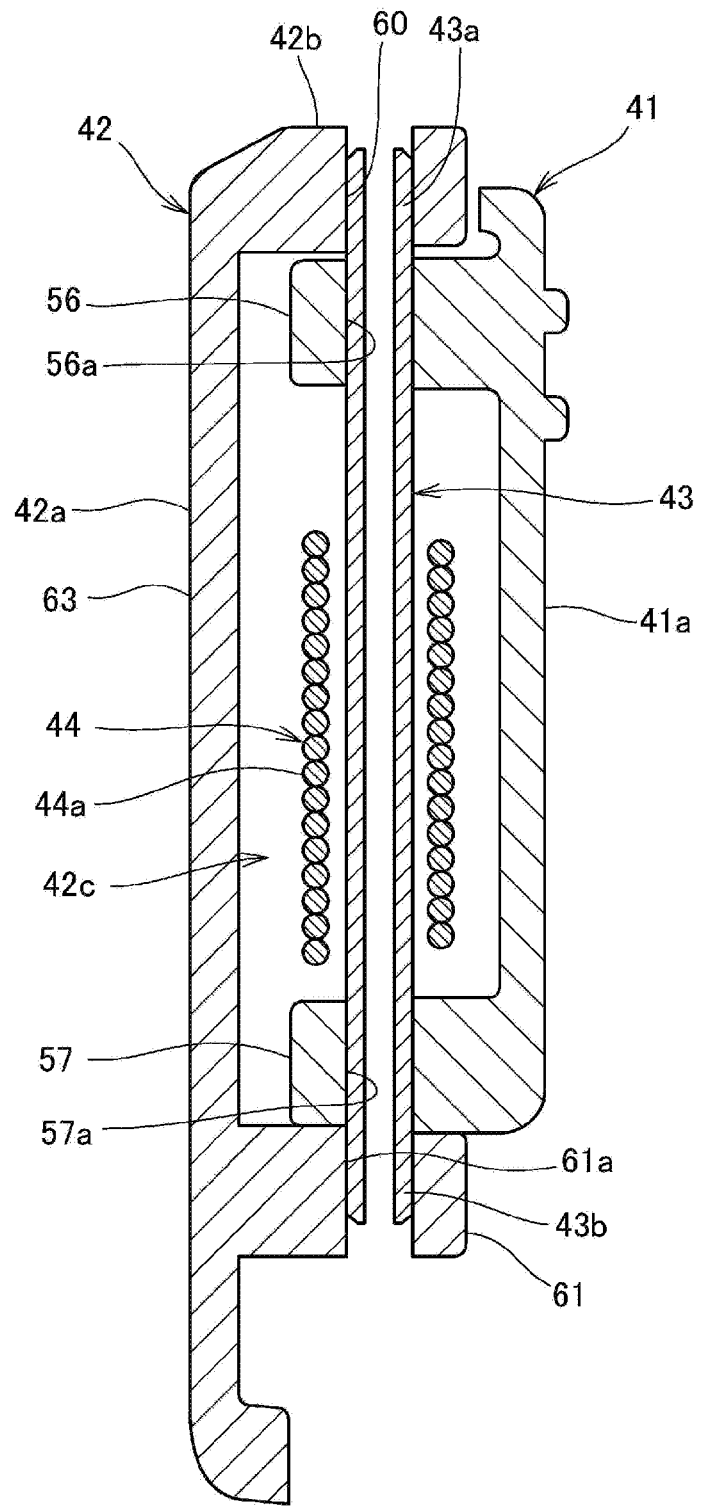
FIG. 8 is a VIII-VIII sectional view in FIG. 6.

FIG. 5 is a left side view of the screen support member 32L on the left side. FIG. 6 is a VI-VI sectional view in FIG. 5. FIG. 7 is a VII-VII sectional view in FIG. 5. FIG. 8 is an VIII-VIII sectional view in FIG. 6. Here, FIG. 4 through FIG. 8 show the state corresponding to the "low position" of the windscreen 31.

The screen support member 32L is equipped with a bracket 40 fixed to the meter visor portion 21a on the body side, a rail member 41 provided slidably relative to the bracket 40, a lever member 42 pivotably attached to the rail member 41, a hinge shaft 43 (hinge) pivotably coupling the lever member 42 and the rail member 41, and an elastic member 44 interposed between the lever member 42 and the rail member 41.

The bracket 40 is equipped with a rodlike bracket body portion 40a extending in a rearwardly upward position to go along the front face of the meter visor portion 21a and a fixing portion 40b formed on an outside face portion at a lower portion of the bracket body portion 40a.

The bracket fixing bolts 45, 45 inserted through the stay member 21 (FIG. 4) of the meter visor portion 21a from the outer side in the vehicle width direction are fastened to the fixing portion 40b, so that the bracket 40 is fixed to the body side.

Further, the bracket 40 is equipped with a lock pin 46 protruding from an outside face portion of an upper portion outward (toward the left side) in the vehicle width direction and a slide pin 47 protruding from an outside face portion of a lower portion outward in the vehicle width direction. The lock pin 46 and the slide pin 47 are provided mutually in parallel and are integrally fixed to the bracket body portion 40a. The slide pin 47 is provided above the fixing portion 40b.

The rail member 41 is equipped with a plate-like rail member body portion 41a disposed to cover the outside face of the bracket 40 from the outer side in the vehicle width direction and a plate-like screen stay portion 41b extending from a front verge of the rail member body portion 41a inward in the vehicle width direction.

The screen stay portion 41b is formed at a front portion and a rear portion with fixing holes 41c, 41c piercing through the screen stay portion 41b.

The windscreen 31 is fixed to a front face of the screen stay portion 41b. In detail, the windscreen 31 is fixed to the rail member 41 by screen fixtures 31a, 31a (FIG. 2) inserted from the front side into the windscreen 31 and the fixing holes 41c, 41c.

The right and left screen support member 32L, 32R are mutually coupled by the windscreen 31 because the windscreen 31 is fixed to the right and left rails 41, 41.

Figure 9:
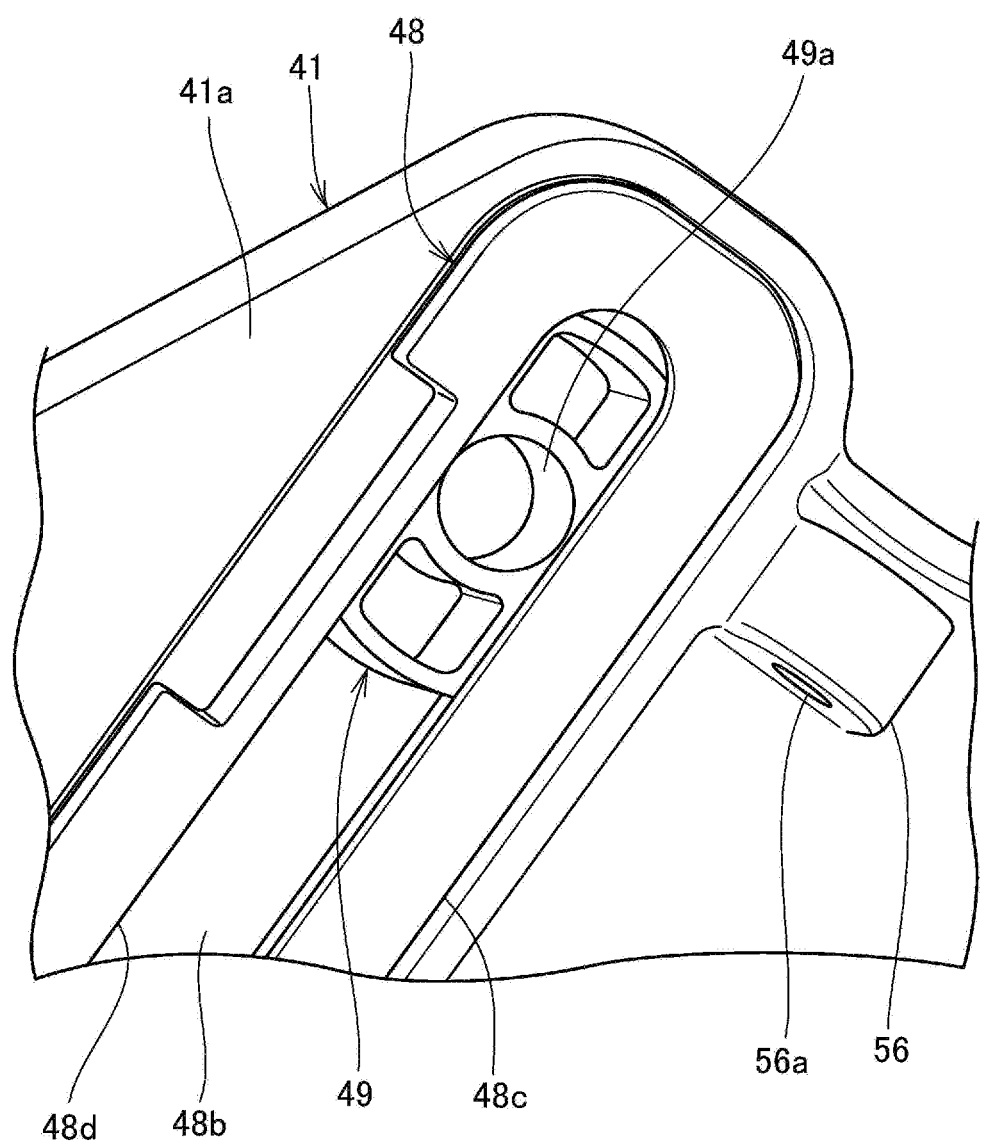
FIG. 9 is a perspective view of an upper portion of a rail member body portion as viewed from an outer lateral side.

FIG. 9 is a perspective view of an upper portion of the rail member body portion 41a as viewed from the outer side.

Referring to FIG. 5 through FIG. 9, the upper portion of the rail member body portion 41a is formed with an upper opening 41d of an elongate hole shape extending in the sliding direction of the windscreen 31. An upper guide member 48 taking a rectangular shape in a side view is fixedly fitted in the upper opening 41d.

The upper guide member 48 is equipped with a peripheral wall portion 48a fitted in an inner peripheral surface of the upper opening 41d, an upper elongate hole 48b (elongate hole) formed inside the peripheral wall portion 48a, an outside flange portion 48c extending from an end portion on the outer side in the vehicle width direction of the peripheral wall portion 48a radially outward of the upper elongate hole 48b, and an inside flange portion 48d extending from the end portion on the outer side in the vehicle width direction of the peripheral wall portion 48a radially inward of the upper elongate hole 48b.

The upper elongate hole 48b is a through hole piercing in the vehicle width direction and extends to be long in the sliding direction of the windscreen 31. The lock pin 46 of the bracket 40 is inserted through the upper elongate hole 48b from inside in the vehicle width direction. The lock pin 46 is relatively movable within the upper elongate hole 48b along the upper elongate hole 48b.

The upper guide member 48 is positioned in the axial direction of the lock pin 46 through abutment of an outside flange portion 48c on a peripheral verge portion of the upper opening 41d.

The lock pin 46 has attached thereto a block-like slider 49 sliding within the upper elongate hole 48b. The lock pin 46 slides within the upper elongate hole 48b through the slider 49.

The slider 49 is equipped with an attaching hole 49a fitted on a peripheral portion of a shaft portion of the lock pin 46 and a sliding portion 49b (FIG. 6) in slidable contact with the inner periphery of the upper elongate hole 48b. The slider 49 abuts on an inside flange portion 48d of the upper guide member 48 to be positioned in the axial diction of the lock pin 46.

The upper elongate hole 48b of the rail member 41 is fitted on the lock pin 46 from the outer side in the vehicle width direction. The lock pin 46 is equipped with an outside protruding portion 46a that pierces through the upper elongate hole 48b to protrude beyond the upper elongate hole 48b in the vehicle width direction.

The outside protruding portion 46a has attached thereto a washer 50 being larger in diameter than the upper elongate hole 48b and a clip 51 for preventing the washer 50 from coming off in the axial direction. The rail member 41 is prevented by the washer 50 located outside the rail member 41 from coming off the lock pin 46.

As shown in FIG. 5, at a lower portion of the rail member body portion 41a, there is formed a lower opening 41e of an elongate hole shape extending in the sliding direction of the windscreen 31. A lower guide member 52 being rectangular in a side view is fitted in the lower opening 41e and is fixed thereto.

The lower guide member 52 is formed with a lower elongate hole 52a (second elongate hole) extending in the sliding direction of the windscreen 31.

The slide pin 47 of the bracket 40 is inserted through the lower elongate hole 52a from inside in the vehicle width direction. The slide pin 47 is relatively movable within the lower elongate hole 52a along the lower elongate hole 52a.

A lower slider 53 formed like the slider 49 is attached to the slide pin 47, and the slide pin 47 slides through the lower slider 53 within the lower elongate hole 52a.

At the inner side than the lower elongate hole 52a in the vehicle width direction, the slide pin 47 is equipped with a lower washer 54 and a lower clip 55 for preventing the lower washer 54 from coming off in the axial direction.

The rail member 41 is prevented by the lower washer 54 located outside the rail member 41 from coming off the slide pin 47.

The rail member 41 slides in the vertical direction relative to the lock pin 46 and the slide pin 47 by being slidden with the upper elongate hole 48b and the lower elongate hole 52a guided respectively by the lock pin 46 and the slide pin 47.

In a side view, the upper elongate hole 48b of the rail member 41 is provided to be slanted rearward relative to the vertical. That is, the center line C (FIG. 5) in the longitudinal direction of the upper elongate hole 48b is slanted rearward.

Further, in the side view, the lower elongate hole 52a is located on the front and lower side of the upper elongate hole 48b and is slanted rearward at a larger inclination than that of the upper elongate hole 48b. That is, in the side view, the upper elongate hole 48b and the lower elongate hole 52a are arranged at mutually different angles.

As shown in FIG. 5 and FIG. 8, the rail member 41 is equipped behind the upper elongate hole 48b with hinge shaft support portions 56, 57 protruding outward from the rail member body portion 41a. The hinge shaft support portions 56, 57 are provided to be mutually spaced in the vertical direction. The hinge shaft support portions 56, 57 are equipped with support holes 56a, 57a into which a hinge shaft 43 is inserted.

An upper portion of the hinge shaft 43 is supported by the hinge shaft support portion 56 on the upper side. The hinge shaft 43 is equipped with an upper protruding portion 43a protruding upward beyond the hinge shaft support portion 56 on the upper side.

A lower portion of the hinge shaft 43 is supported by the hinge shaft support portion 57 on the lower side. The hinge shaft 43 is equipped with a lower protruding portion 43b protruding downward beyond the hinge shaft support portion 56 on the lower side.

The hinge shaft 43 is located behind the upper elongate hole 48b in a side view and is arranged to be slanted rearward almost in parallel to the upper elongate hole 48b.

The lever member 42 is a plate-like member disposed outside an upper portion of the rail member 41 and covers the upper portion of the rail member 41 from outside.

The lever member 42 is equipped with a sidewall portion 42a covering the upper portion of the rail member 41 from outside and a peripheral wall portion 42b extending from a peripheral portion of the sidewall portion 42a inward in the vehicle width direction. A space 42c whose periphery is encircled by the peripheral wall portion 42b is formed inside in the vehicle width direction of the lever member 42.

The sidewall portion 42a covers the upper elongate hole 48b, the hinge shaft 43, the elastic member 44 and the like from outside.

The lever member 42 is equipped at an upper face portion of the peripheral wall portion 42b with an insert through hole 60 into which the upper protruding portion 43a of the hinge shaft 43 is inserted from the lower side. Further, the lever member 42 is equipped on a lower side than the insert through hole 60 with a shaft coupling portion 61 protruding from the sidewall portion 42a inside in the vehicle width direction. The shaft coupling portion 61 is formed with an insert through hole 61a into which the lower protruding portion 43b of the hinge shaft 43 is inserted from the upper side.

The lever member 42 is coupled with the rail member 41 through the hinge shaft 43 and is pivotable about the hinge shaft 43.

The insert through hole 60 and the insert through hole 61a of the lever member 42 are respectively fixed to the upper protruding portion 43a and the lower protruding portion 43b of the hinge shaft 43. In disassembling the hinge shaft 43, the lever member 42 is replaced.

The lever member 42 is equipped with a lock portion 63 covering the upper elongate hole 48b from outside and ahead of the hinge shaft 43 and a pressured portion 64 covering a rear portion of the rail member body portion 41a from outside and behind the hinge shaft 43.

The lock portion 63 of the lever member 42 has attached thereto a lock plate 65 covering the upper elongate hole 48*b* of the rail member 41 from outside. The lock plate 65 is disposed within the space 42*c* and is located between the sidewall portion 42*a* of the lever member 42 and the rail member body portion 41*a*.

The lock plate 65 is a vertically long plate having the length covering the whole of the upper elongate hole 48*b* and is fixed to the lock portion 63 by fixing bolts 66, 66 fastened at an upper end portion and a lower end portion.

In detail, the lock plate fixing bolts 66, 66 are inserted into through holes 63*a*, 63*a* of the lock portion 63 from outside in the vehicle width direction and are fastened to fixing holes 65*a*, 65*a* formed at the upper end portion and the lower end portion of the lock plate 65. Collars 67, 67 fitting on the lock plate fixing bolts 66, 66 are interposed between the through holes 63*a*, 63*a* and the lock plate 65. The lock plate 65 is attached through the collars 67, 67 to be offset inward in the vehicle width direction from the sidewall portion 42*a*.

The lock plate 65 is disposed almost in parallel to the upper elongate hole 48*b* and is slanted rearward along the center line C in the longitudinal direction of the upper elongate hole 48*b*.

The lock plate 65 is formed with a plurality of holes 68 (represent plurality) engageable with the lock pin 46 of the bracket 40.

The holes 68 are distributed between the upper and lower fixing holes 65*a*, 65*a* and are arranged vertically along the center line C in the longitudinal direction of the upper elongate hole 48*b*. The holes 68 are arranged to be mutually regular intervals. In the present embodiment, the holes 68 are arranged at five places.

The holes 68 are formed like elongate holes each extending to be orthogonal to the center line C in the longitudinal direction of the upper elongate hole 48*b*.

As shown in FIG. 6 and FIG. 8, the elastic member 44 is a torsion coil spring and is provided coaxially of the hinge shaft 43 with the hinge shaft 43 piercing through the inner periphery of a coil portion 44*a*. In detail, the elastic member 44 is arranged between the hinge shaft support portion 56 and the hinge shaft support portion 57 coaxially of the hinge shaft 43.

The elastic member 44 is coupled to the rail member 41 at one end 44*b* extending from the coil portion 44*a* and is coupled to the lever member 42 at the other end extending from the coil portion 44*a*.

The elastic member 44 urges the lever member 42 so that the lever member 42 is pivoted in a direction to bring the holes 68 of the lock plate 65 into engagement with the lock pin 46, that is, in the arrow A direction in FIG. 6.

A state that one hole 68 is engaged with the lock pin 46 as shown in FIG. 6 is called "lock state". In the "lock state", the lock plate 65 is pressured by the urging force of the elastic member 44 to be fitted on the lock pin 46. Thus, a simple configuration can keep the "lock state".

In the present embodiment, any desired hole within the holes 68 of the lock plate 65 is made to be engaged with the lock pin 46, so that the height of the windscreen 31 can be changed stepwise.

An extreme end portion of an outside protruding portion 46*a* of the lock pin 46 engaged with the holes 68 is formed with a taper portion 46*b* (FIG. 6) tapered off in the engaging direction with the holes 68 and a flat portion 46*c* (FIG. 7) for supporting the weight of the windscreen 31 and the like.

In detail, as viewed in the axial direction (vertical direction) of the center axis C in the longitudinal direction of the upper elongate hole 48*b* as shown in FIG. 6, the taper portion 46*b* is formed at a front face and a rear face of the extreme end portion of the lock pin 46. Like this, because the taper portion 46*b* is formed at the extreme end portion of the lock pin 46, it is possible to engage the holes 68 with the lock pin 46 easily.

Further, as the lock pin 46 is viewed from the rear side as shown in FIG. 7, the flat portion 46*c* being even is formed at an upper surface and a lower surface of the extreme end portion of the lock pin 46. Thus, the loads of the windscreen 31, the rail member 41 and the like can be supported at the flat portion 46*c* being large in area, so that the windscreen 31 and the like can be supported rigidly.

Figure 10:
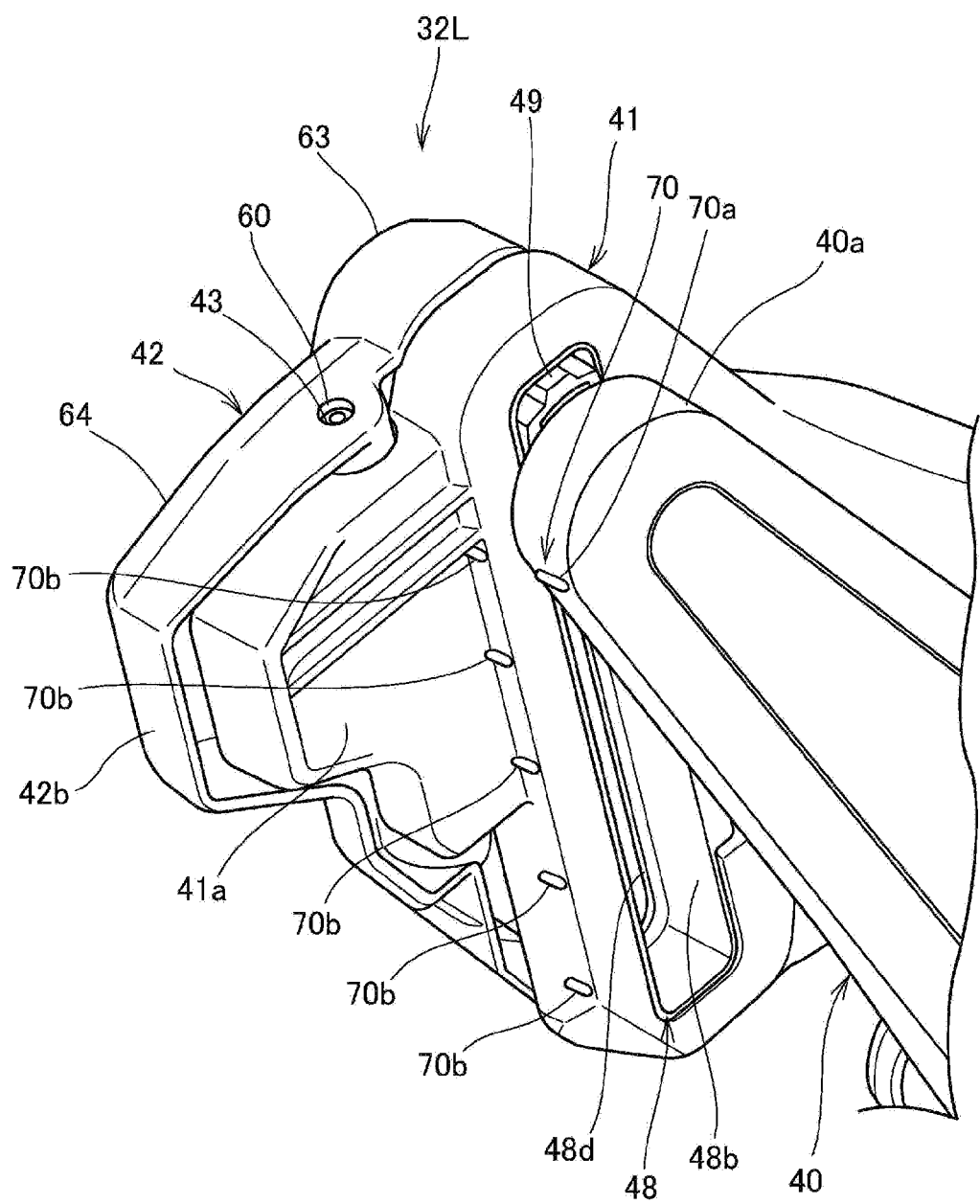
FIG. 10 is a perspective view of an upper portion of a screen support member as viewed from the rear side.

FIG. 10 is a perspective view of the upper portion of the screen support member 32L as viewed from the rear side.

As shown in FIG. 10, the screen support member 32L is provided with indicators 70 that can make the alignments of the holes 68 with the lock pin 46.

The indicators 70 are equipped with a bracket-side mark 70*a* formed on a rear face at the upper portion of the bracket body portion 40*a* and a plurality of rail-side marks 70*b* formed on the rail member body portion 41*a*.

The rail-side marks 70*b* are provided in correspondence to the intervals and the number of the holes 68 and are formed at five places in the present embodiment. The bracket-side mark 70*a* and the rail-side marks 70*b* are provided so that when the rail-side marks 70*b* are each aligned with the bracket-side mark 70*a*, the holes 68 each match the lock pin 46 in position. The indicators 70 are provided on the rear face side of the screen support member 32L so that the indicators 70 are able to be visually confirmed by the rider on the seat 13 side.

Figure 11:
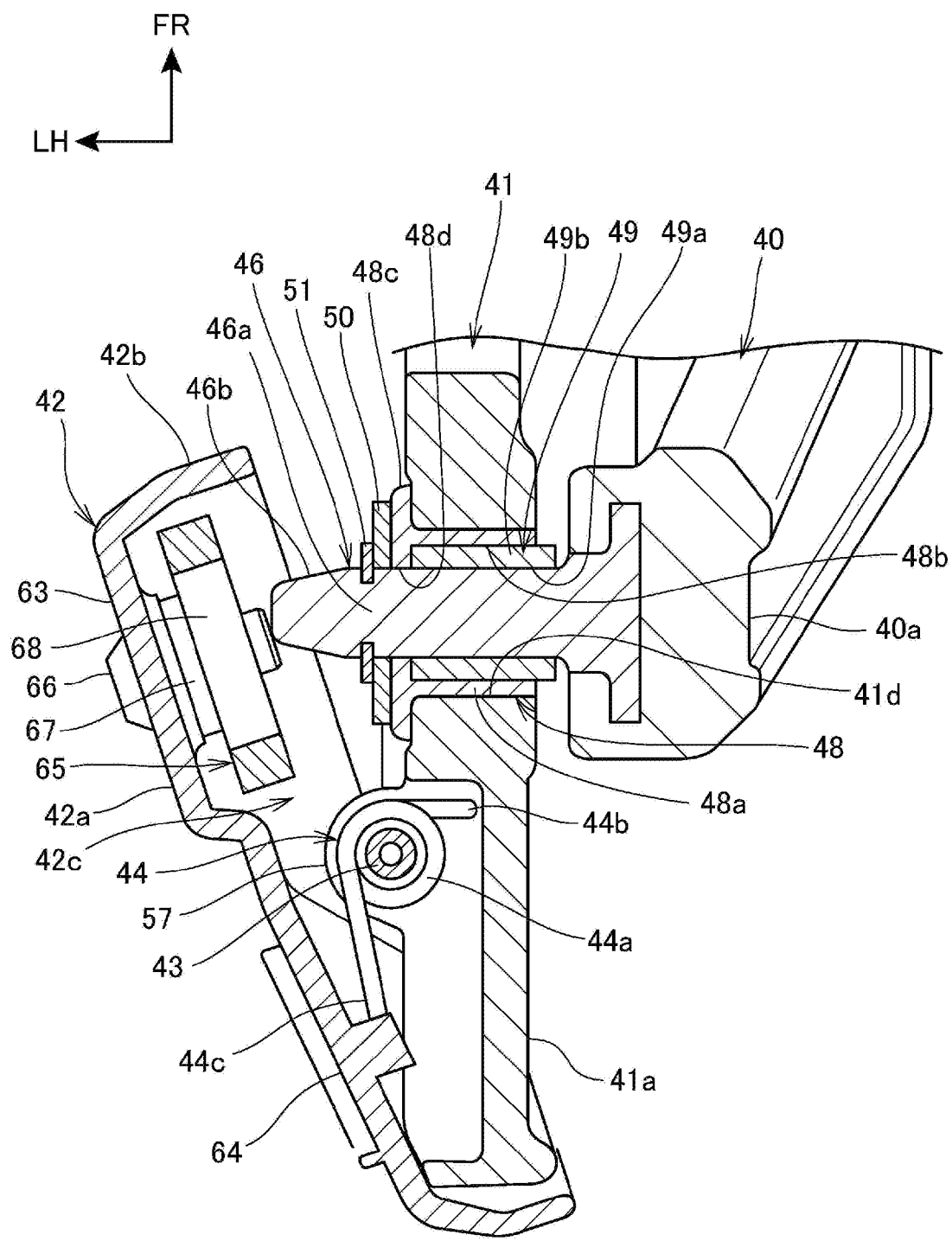
FIG. 11 is a sectional view showing the state that a "lock state" in FIG. 6 is released.
Figure 12:
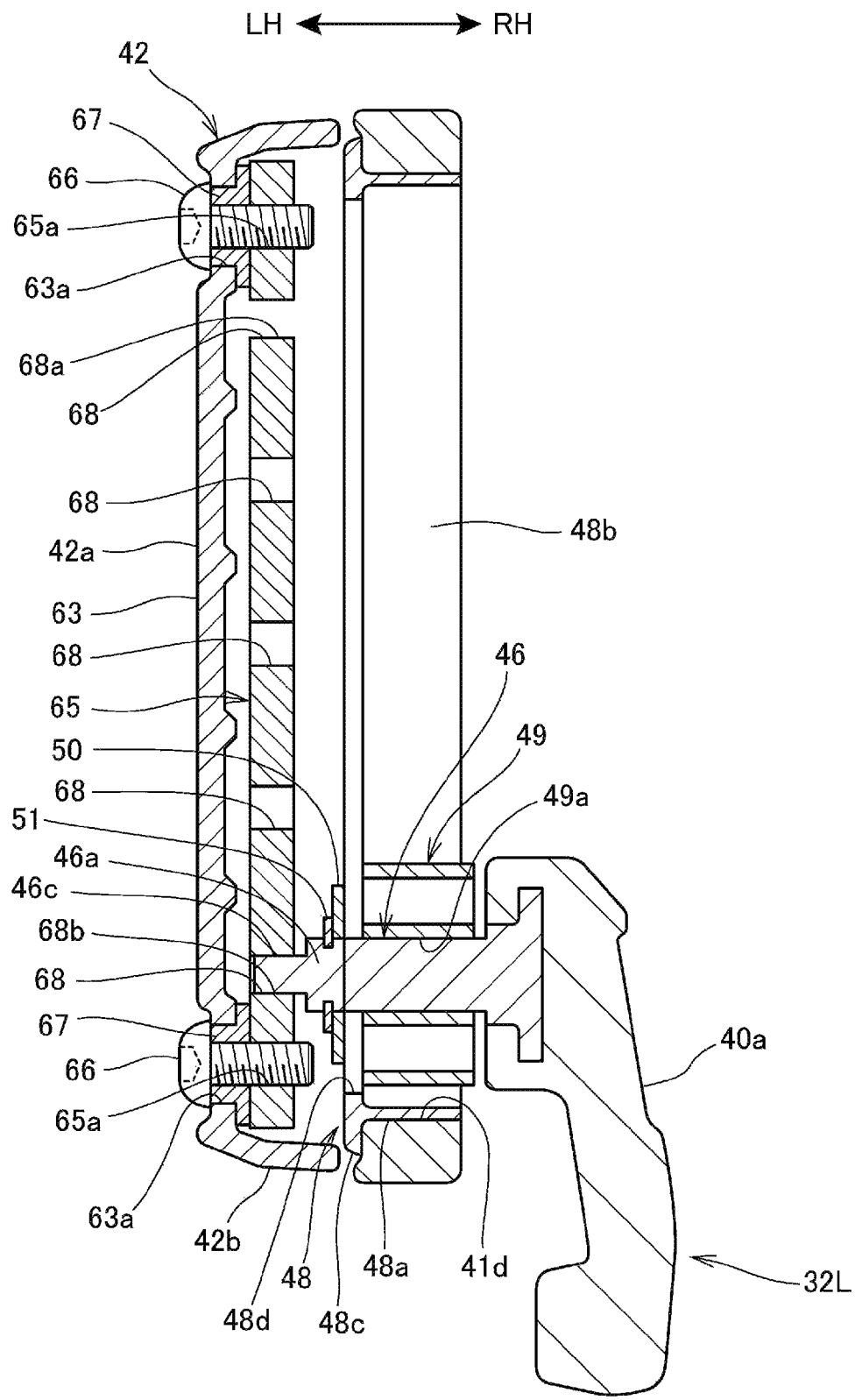
FIG. 12 is a VII-VII sectional view in FIG. 5 with the windscreen set at a "high position".

FIG. 11 is a sectional view showing a state that the "lock state" in FIG. 6 is released. FIG. 12 is a VII-VII sectional view in FIG. 5 in the state that the windscreen 31 is set to the "high position".

Here, the operation procedure for changing the height and angle of the windscreen 31 will be described.

In the state shown in FIG. 5 through FIG. 7, the windscreen 31 is set to the "low position" shown in FIG. 2, and the holes 68 of the lock plate 65 are engaged with the lock pin 46 at a hole 68*a* of the highest place. In this state, the hole 68*a* is engaged with the lock pin 46, and thus, the rail member 41 is restricted from moving. Further, in this state, the slide pin 47 is located at the upper portion within the lower elongate hole 52*a*.

In the "lock state" in FIG. 6, when the rider pressures the pressured portion 64 in a direction against the urging force of the elastic member 44 (in the arrow B direction in FIG. 6), that is, inward in the vehicle width direction, the lever member 42 is pivoted about the hinge shaft 43, and the lock plate 65 of the lock portion 63 is moved outward in the vehicle width direction as shown in FIG. 11. Thus, the engagement of the hole 68*a* with the lock pin 46 is released to becomes a "lock release state", and the rail member 41 is enabled to slidably move the upper elongate hole 48*b* upward along the lock pin 46.

In detail, the rider can easily operate the pressured portion 64 by pinching by hand the pressured portion 64 and the rail member body portion 41*a* being inside of the pressured portion 64 in the vehicle width direction. In the present embodiment, because the screen support members 32L, 32R are respectively provided left and right, the rider can simultaneously release the "lock state" of the right and left screen support members 32L, 32R by, for example, pinching the pressured portion 64 of the screen support member 32L by the left hand and pinching the pressured portion 64 of the screen support member 32R by the right hand.

Then, the rider manually draws the right and left rail members 41, 41 upward with the "lock release state" kept as it is and aligns a desired hole of the holes 68 with the position of the lock pin 46 by reference to the marks of the indicators 70. The rider then releases the pressuring on the pressured member 64 to engage the hole 68 with the lock pin 46. Thus, the rail member 41, 41 become the "lock state" at a height position corresponding to the desired hole 68. When the rail members 41, 41 are moved upward, the windscreen 31 and the lever members 42, 42 are also moved integrally with the rail members 41, 41.

In FIG. 12, the holes 68 of the lock plate 65 are engaged with the lock pin 46 at the hole 68b of the lowest place, and in this state, the windscreen 31 is becomes the "high position" shown in FIG. 3. Further, in this state, the slide pin 47 is located at the lower portion within the lower elongate hole 52a.

When the right and left rail members 41, 41 are moved upward, the lower elongate holes 52a, 52a are also slidden upward along the slide pins 47. In the present embodiment, because the upper elongate hole 48b and the lower elongate hole 52a are arranged at mutually different angles, the vertical movement of the rail members 41, 41 causes the angle of the rail members 41, 41 to change. Therefore, changes can be made not only in the height of the windscreen 31 but also in the angle of the windscreen 31. In the present embodiment, as shown in FIG. 2 and FIG. 3, the windscreen 31 disposed to be slanted rearward rises up to come close to the vertical as its height position becomes higher.

As described hereinabove, according to the present embodiment to which the present invention is applied, the windshield device 30 for the motorcycle 1 is equipped with the windscreen 31 provided to be adjustable in height, the windscreen 31 is attached through the rail member 41, the rail member 41 is equipped with the upper elongate hole 48b, the lever member 42 covering the upper elongate hole 48b and the lock pin 46 fixed to the body side are equipped, the rail member 41 is provided slidably relative to the lock pin 46 inserted through the upper elongate hole 48b, and the lever member 42 is equipped with the plurality of holes 68 with which the lock pin 46 is engageable. Thus, by sliding the rail member 41 attached to the windscreen 31 relative to the lock pin 46 on the body side through the upper elongate hole 48b and by engaging the lock pin 46 with a desired hole of the plurality of holes 68 of the lever member 42, it is possible to adjust the height of the windscreen 31 at a desired position. Therefore, the height of the windscreen 31 can be adjusted in a simplified configuration, and the windshield device 30 can be made to be of the movable type and to be downsized. Further, since the windshield device 30 can be made as of the movable type without using any long shaft extending in the vehicle width direction, there can be avoided adverse effects of aerodynamic characteristics and appearance attributed to the shaft.

Further, the lever member 42 is equipped with the lock plate 65 provided inside the lever member 42, and the plurality of holes 68 are formed in the lock plate 65. Thus, it is possible for the lever member 42 to protect the plurality of holes 68 with which the lock pin 46 is engaged, and thus, the holes 68 can be prevented from being choked with dust. Further, covering the holes 68 by the lever member 42 can improve the quality of appearance of the windshield device 30. Further, it is possible to make only the lock plate 65 of a high-strength material such as metal or the like, and weight saving can be realized.

Further, the lever member 42 is provided pivotably about the hinge shaft 43. The lever member 42 is urged by the elastic member 44 in the direction to engage the holes 68 with the lock pin 46 and is equipped with the pressured portion 64 that is pressured against the elastic member 44. Thus, it is possible to keep the engagement state of the holes 68 with the lock pin 46 by the urging force of the elastic member 44. Furthermore, the height of the windscreen 31 can be changed by releasing the engagement of the holes 68 with the lock pin 46 through a simple operation of pressuring the pressured portion 64, and thus, the operability is excellent.

Further, because the rail member 41 is equipped with the lower elongate hole 52a that is slidable relative to the body side in the direction different from that in which the upper elongate hole 48b is slidable, the angle of the windscreen 31 can be changed when the rail member 41 is slidden through the upper elongate hole 48b and the lower elongate hole 52a. Thus, the windscreen 31 can be adjusted not only in height but also in the angle at the same time.

Further, the lower elongate hole 52a is provided at the front and lower side of the upper elongate hole 48b and is slanted rearward at a larger inclination than the upper elongate hole 48b, and thus, it is possible to adjust the angle of the windscreen 31.

Further, because the lock pin 46 is equipped with the taper portion 46b tapered off in the engaging direction with the holes 68 and the flat portion 46c for supporting the load of the windscreen 31, it is possible to easily engage the lock pin 46 with the holes 68 thanks to the taper portion 46b and to effectively support the load of the windscreen 31 at the flat portion 46c.

Further, the bracket 40 fixed to the body is equipped, and the lock pin 46 is provided on the bracket 40, so that the lock pin 46 can easily be provided on the body side.

Further, the plurality of holes 68 of the lever member 42 are provided at three or more places, and the indicators 70 enabling the alignments of the plurality of holes 68 with the lock pin 46 are provided at the location being visually confirmable from the rider side in correspondence to the positions of the plurality of holes 68. Thus, because the rider is able to engage the lock pin 46 with a desired hole 68 by reference to the marks of the indicators 70, the adjustment of the windscreen 31 in height is easy.

Further, since the slider 49 fitted in the upper elongate hole 48b and being slidable relative to the upper elongate hole 48b is attached to the lock pin 46, it is possible to slide the rail member 41 relative to the lock pin 46 through the slider 49 accurately and smoothly.

Further, the rail members 41, 41 are provided as right and left pair to support the windscreen 31 on the right and left sides, and the lock pins 46 are engaged with the holes 68 respectively on the right and left rail members 41, 41. Thus, since the right and left rail members 41, 41 can be fixed by the engagements of the lock pins 46 with the holes 68, the windscreen 31 can be supported rigidly.

Incidentally, the foregoing embodiment intends to show one form to which the present invention is applied. The present invention is not limited to the foregoing embodiment.

In the foregoing embodiment, the holes 68 have been described as those provided at the lock plate 65 of the lever member 42. However, the present invention is not limited to this. For example, the holes 68 may be directly formed at the sidewall portion 42a of the lever member 42.

Further, in the foregoing embodiment, the holes 68 have been described as those provided at the right and left lever members 42, 42. However, the present invention is not limited to this. For example, there may be taken a configuration wherein the holes 68 may be provided only at the lever member 42 on one side and wherein the engagement of the holes 68 with the lock pin 46 is made only at the lever member 42 on one side.

Further, in the foregoing embodiment, description has been made taking as an example the configuration wherein the upper elongate hole 48b of the upper guide member 48 of the rail member 41 is slidden through the slider 49 on the lock pin 46. However, the present embodiment is not limited to this. For example, there may be taken a configuration that an elongate hole directly formed on the rail member body portion 41a of the rail member 41 is directly slidden relative to the lock pin 46 without the intervention of the slider 49.

Further, in the foregoing embodiment, description has been made taking the motorcycle 1 as an example of the saddle-ride type vehicle. However, the present invention is not limited to this. For example, the present invention may be applied to a three-wheel saddle-ride type vehicle with two of front wheels or rear wheels or to a saddle-ride type vehicle with four or more wheels.

REFERENCE SIGNS LIST

1 Motorcycle (saddle-ride type vehicle)
30 Windshield device
31 Windscreen (windshield portion)
40 Bracket
41 Rail member
42 Lever member
43 Hinge shaft (hinge)
44 Elastic member
46 Lock pin
46b Taper portion
46c Flat portion
48b Upper elongate hole (elongate hole)
49 Slider
52a Lower elongate hole (second elongate hole)
64 Pressured portion
65 Lock plate
68 Hole
70 Indicator

The invention claimed is:

1. A windshield device for a saddle-ride type vehicle comprising a windshield portion (31) provided adjustably in height,
wherein the windshield portion (31) is attached through a rail member (41), the rail member (41) including an elongate hole (48b),
the windshield device includes a lever member (42) covering the elongate hole (48b) and a lock pin (46) fixed to a body side,
the rail member (41) is provided slidably relative to the lock pin (46) inserted through the elongate hole (48b), and
the lever member (42) includes a plurality of holes (68) with which the lock pin (46) is engageable.

2. The windshield device for the saddle-ride type vehicle according to claim 1,
wherein the lever member (42) includes a lock plate (65) provided inside the lever member (42), and
the plurality of holes (68) are formed at the lock plate (65).

3. The windshield device for the saddle-ride type vehicle according to claim 1,
wherein the lever member (42) is provided pivotably about a hinge (43),
the lever member (42) is urged by an elastic member (44) in a direction to engage the holes (68) with the lock pin (46), and
the lever member (42) includes a pressured portion (64) pressured against the urging force of the elastic member (44).

4. The windshield device for the saddle-ride type vehicle according to claim 1, wherein the rail member (41) includes a second elongate hole (52a) being slidable relative to the body side in a direction different from the elongate hole (48b).

5. The windshield device for the saddle-ride type vehicle according to claim 4, wherein the second elongate hole (52a) is provided at a front and lower side of the elongate hole (48b), and the second elongate hole (52a) is slanted at a larger inclination than the elongate hole (48b) in a side view.

6. The windshield device for the saddle-ride type vehicle according to claim 1, wherein the lock pin (46) includes a taper portion (46b) and a flat portion (46c), the taper portion (46b) being tapered off in the engaging direction with the holes (68), the flat portion (46c) being formed at a surface supporting the load of the windshield portion (31).

7. The windshield device for the saddle-ride type vehicle according to claim 1, wherein the windshield device includes a bracket (40) fixed to a body, and the lock pin (46) is provided at the bracket (40).

8. The windshield device for the saddle-ride type vehicle according to claim 1,
wherein the plurality of the holes (68) of the lever member (42) are provided at three or more places, and
indicators (70) enabling the alignments of the plurality of holes (68) with the lock pin (46) are provided at a location being visually confirmable from a rider side in correspondence to the positions of the plurality of holes (68).

9. The windshield device for the saddle-ride type vehicle according to claim 1, wherein a slider (49) inserted into the elongate hole (48b) and being slidable relative to the elongate hole (48b) is attached to the lock pin (46).

10. The windshield device for the saddle-ride type vehicle according to claim 1,
wherein the at least one rail member (41) includes a plurality of right and left rail members (41), the plurality of right and left rail members (41) supporting the windshield portion (31) on right and left sides, and
the lock pins (46) are respectively engaged with the holes (68) at the rail members (41) on the right and left sides.

* * * * *